Patented May 14, 1940

2,200,370

UNITED STATES PATENT OFFICE 2,200,370

PROCESS FOR THE RECOVERY OF PURE PHENOLS OR PHENOLATES FROM GAS LIQUOR OR THE LIKE

Heinrich Koppers, Essen, Germany, assignor, by mesne assignments, to Koppers Company, Pittsburgh, Pa., a corporation of Delaware No Drawing. Application July 25, 1938, Serial No. 221,258. In Germany July 26, 1937

5 Claims. (Cl. 260—627)

The present invention relates to the recovery of phenols or phenolates from gas liquor and other substances which also contain, besides phenols, impurities especially sulphur or sulphur compounds containing substances such as hydrogen sulphide, and more particularly to a process of recovery of phenols from gas liquor or the like in which the liquor containing the phenol is treated with a solvent for phenols, for instance with benzol which absorbs the phenols from the liquor and from which the absorbed phenols may be extracted again by a suitable treatment with an alkaline solution or in another way.

The expression "phenols" when used in this specification generally means all those compounds which are similar to phenol proper ($C_6H_5OH$), and which are contained in the gas liquor and in other liquors, and which show a certain solubility in the liquor.

It is well known that the phenols present in the waste liquors of coke oven plants and gas works cause severe troubles in the rivers and brooks and that for this reason such waste liquors may not be disposed of in the natural waters without being first purified.

For the removal of phenols from the gas liquor and the like, a method is often used in which the gas liquor is brought into intimate contact with a solvent for phenols. This solvent should, however, be soluble in the liquor only to a small extent. The solvent mostly used for this purpose is benzol. There are, however, still other constituents which may be advantageously used for this purpose and according to this specification the term "solvent" means all such substances as may be found suitable for the recovery of phenols from gas liquor or the like.

In addition to phenols, the gas liquor also contains other impurities of which hydrogen sulphide, carbon dioxide and other acid compounds are of importance. The solvents used for the extraction of the phenols also absorb from the gas liquor considerable amounts of the other impurities stated above. This is a disadvantage for the following reasons:

In order to decrease the high cost for the extraction of phenols from the gas liquor, the phenols removed are made use of for the manufacture of artificial resin and other products. With such a further treatment of phenols, the sulphur compounds and other impurities derived from the gas liquor and contained in the solvent are troublesome. For the separation of phenols from the highly valuable solvent, the latter is mixed with an alkaline solution for instance caustic soda solution. This solution reacts with the phenols with the formation of alkali-metal phenolates highly soluble in water which, however, are practically insoluble in benzol and other solvents. The alkaline solution, however, absorbs from the solvent other acid impurities such as hydrogen sulphide, carbon dioxide and the like, too. Consequently a highly contaminated phenolate solution of little value is obtained. It is possible to remove the acid impurities, such as hydrogen sulphide and the like from the alkali phenolate solution only with great difficulty so that the phenol recovered from the gas liquor and the like is only of little value as a rule.

In order to extract the hydrogen sulphide and other impurities from the solvents, it has been suggested to treat the solvent before the extraction of the phenols with an alkaline solution or with a solution saturated with phenol. The alkaline solution mainly absorbs the hydrogen sulphide and the carbon dioxide, and, in addition to the same also absorbs a small amount of phenol from the solvent until the solution is saturated with phenol, after which it may however still be used for the removal of hydrogen sulphide and carbon dioxide until all the alkali is fixed. The spent solution is then replaced.

This proposal has the disadvantage that a considerable amount of alkaline solution is spent in the separate washing of the solvent with solution. Thus the expenditures incurred by the removal of phenols from the waste liquor become considerably higher.

Now, the main object of my present invention consists in the provision of such improvements for the extraction of phenols from the gas liquors and the like by means of solvents which improvements will reduce the cost of the recovery of pure phenols to a great extent, and which will ensure the recovery of pure phenols from said liquors in a more effective and simple way.

The process according to the invention consists in that the solvent saturated with phenols, which solvent contains also the undesirable impurities, such as hydrogen sulphide and the like, is washed (before the treatment with an alkaline solution for the purpose of extracting the phenols) at a comparatively low temperature with an aqueous alkaline phenolate solution whereupon the absorbed impurities such as hydrogen sulphide, carbon dioxide and the like are expelled again from the aqueous alkaline phenolate solution, after separation from the solvent, by increasing the temperature without resulting in an appreciable loss of phenols during the expelling of the impurities, the phenolate solution regenerated in this way being used again for the removal of impurities from other quantities of the solvent.

According to the invention, I preferably use an aqueous sodium phenolate solution for the removal of hydrogen sulphide and carbon dioxide from the solvent, for instance an aqueous solution which contains about 400 grams of sodium phenolate in one liter.

The extraction of the H₂S and CO₂ is carried out at normal or moderately increased temperature, say below 40 degrees centigrade. The phenol bearing solvent to be treated is led through the sodium phenolate solution or vice versa in finely atomised state. Since the specific gravity of the aqueous sodium phenolate solution is different from that of the solvent, the aqueous solution separates comparatively easily from the solvent so that it may be independently recovered by decanting or in another suitable manner. It is of advantage to allow the mixture of solvent and aqueous sodium phenolate solution to stand still for a certain period after the treatment, thus effecting an improved separation of both liquids from each other.

After the aqueous phenolate solution is separated from the solvent, it is raised to a high temperature, preferably above 80 degrees centigrade. If necessary, the pressure above the solution may also be reduced at the same time. In this way, the absorbed hydrogen sulphide, carbon dioxide and other impurities escape from the solution while the phenol contained in the solution practically remains completely in the solution.

By the use of a reflux-condenser or dephlegmator any undesired escape of phenol may effectively be prevented.

As soon as the hydrogen sulphide and other impurities are driven-off from the phenolate solution, the solution is cooled-down whereupon it may be used afresh for the treatment of the solvent.

There is very little loss of the phenol to be recovered, that is, a noticeable loss of valuable phenol is not to be met with, when carrying out the process according to the invention. Should it happen that phenol together with hydrogen sulphide or carbon dioxide escape dephlegmation by chance, or that they are absorbed from the phenol solvent, this loss may be compensated again easily by the addition of phenol or phenolate. The alkaline phenolate used is preferably the alkaline phenolate which is recovered from the solvent after the purification. The quantity of akali present in the phenolate solution used for the treatment of the solvent remains practically unchanged.

The process according to the invention offers the great advantage that for the H₂S and CO₂ removal of the impurity from the solvent only such a quantity of valuable alkali is required as is necessary for the recovery of phenol in the form of alkali metal phenolate. The cost incurred by the removal of phenol is only increased by the low consumption of steam or heat which is required for the regeneration of the fouled aqueous phenolate solution.

In the present case such substituted phenols will come into consideration as the homologues of phenol which in their benzol nucleus have a hydroxy group and, moreover, a carboxylic group or sulphonic group, as for instance sodium phenol sulphonate, sodium perahydrobenzoate, sodium-p-hydroxyacetophenate and the like.

Instead of recovering the phenol from the solvent by means of alkali in the form of alkaline phenolate it is also possible to extract the phenols absorbed by the solvent by means of distillation. Also in this case a primary purification of the solvent according to the process is advantageous since the phenols recovered by distillation also mostly contain a certain quantity of troublesome sulphur compounds and other impurities if these impurities were already present in the solvent.

I have now above described the present invention on the lines of a preferred embodiment thereof, but my invention is not limited in all its aspects to the mode of carrying it out as described and shown, since the invention may be variously embodied within the scope of the following claims.

I claim:

1. Process for the recovery of pure phenols from solvents which serve for the separation of phenols from gas liquor and similar matter comprising: treating of solvent at temperatures below 40 degrees centigrade with an aqueous alkali-metal-phenolate solution, separating the solvent from the aqueous alkali-metal-phenolate solution, extracting phenols from the solvent, heating the aqueous alkali-metal-phenolate solution separated from the solvent to a temperature at which the hydrogen sulphide, carbon dioxide and other impurities previously absorbed by the solution escape without driving-off considerable amounts of phenols, cooling-down of the aqueous alkali-metal-phenolate solution, freed from hydrogen sulphide, carbon dioxide and other impurities, and using again the cooled-down aqueous alkali-metal-phenolate solution for the treatment of further quantities of solvent.

2. Process for the recovery of pure phenols from solvents which serve for the separation of phenols from gas liquor and similar matter comprising: treating the solvent at temperatures below 40 degrees centigrade with an aqueous alkali-metal-phenolate solution, separating the solvent from the aqueous alkali-metal-phenolate solution, extracting phenols from the solvent, heating the aqueous alkali-metal-phenolate solution separated from the solvent, while decreasing the pressure at the same time, to a temperature at which the hydrogen sulphide, carbon dioxide and other impurities previously absorbed by the solution escape without driving-off considerable amounts of phenols, cooling-down of the aqueous alkali-metal-phenolate solution freed from hydrogen sulphide, carbon dioxide and other impurities, and using again the cooled-down aqueous alkali-metal-phenolate solution for the treatment of further quantities of solvent.

3. Process for the recovery of pure phenols from solvents which serve for the separation of phenols from gas liquor and similar matter comprising: treating the solvent at temperatures below 40 degrees centigrade with an aqueous alkali-metal-phenolate solution, separating the solvent from the aqueous alkali-metal-phenolate solution, extracting phenols from the solvent by a treatment of the solvent with an alkaline solution, heating the aqueous alkali-metal-phenolate solution separated from the solvent to a temperature at which the hydrogen sulphide, carbon dioxide and other impurities previously absorbed by the solution escape without driving-off considerable amounts of phenols, cooling-down the aqueous alkaline solution of phenolate freed from hydogen sulphide, carbon dioxide and other impurities, and using again the cooled-down aqueous alkali-metal-phenolate solution for the treatment of further quantities of solvent.

4. Process for the recovery of pure phenols from solvents which serve for the separation of phenols from gas liquor and similar matter comprising: treating the solvent at temperatures below 40 degrees centigrade with an aqueous alkali-metal-phenolate solution, separating the solvent from the aqueous alkali-metal-phenolate solution, extracting phenols from the solvent by distillation, heating the aqueous alkali-metal-phenolate solution separated from the solvent to a temperature at which the hydrogen sulphide, carbon dioxide and other impurities previously absorbed by the solution escape without driving-off considerable amounts of phenols, cooling-down the aqueous alkali-metal-phenolate solution freed from hydrogen sulphide, carbon dioxide and other impurities, and using again the cooled-down aqueous alkali-metal-phenolate solution for the treatment of further quantities of solvent.

5. Process for the recovery of pure phenols from solvents which serve for the separation of phenols from gas liquor and similar matter comprising: treating the solvent at temperatures below 40 degrees centigrade with an aqueous alkali-metal-phenolate solution, separating the solvent from the aqueous alkali-metal-phenolate solution, extracting phenols from the solvent, heating the aqueous alkali-metal-phenolate solution separated from the solvent to a temperature at which the hydrogen sulphide, carbon dioxide and other impurities previously absorbed by the solution escape without driving-off considerable amounts of phenols, cooling-down of the aqueous alkali-metal-phenolate solution freed from hydrogen sulphide, carbon dioxide and other impurities, adding phenol to the cooled-down solution so that a sufficient quantity of phenol is contained in the solution, and using again the cooled-down aqueous alkali-metal-phenolate solution for the treatment of further quantities of solvent.

HEINRICH KOPPERS.